Dec. 24, 1957 C. A. DEBEL 2,817,756
VARIABLE BANDWIDTH CONSTANT PEAK-AMPLITUDE DISCRIMINATOR
Filed June 3, 1952
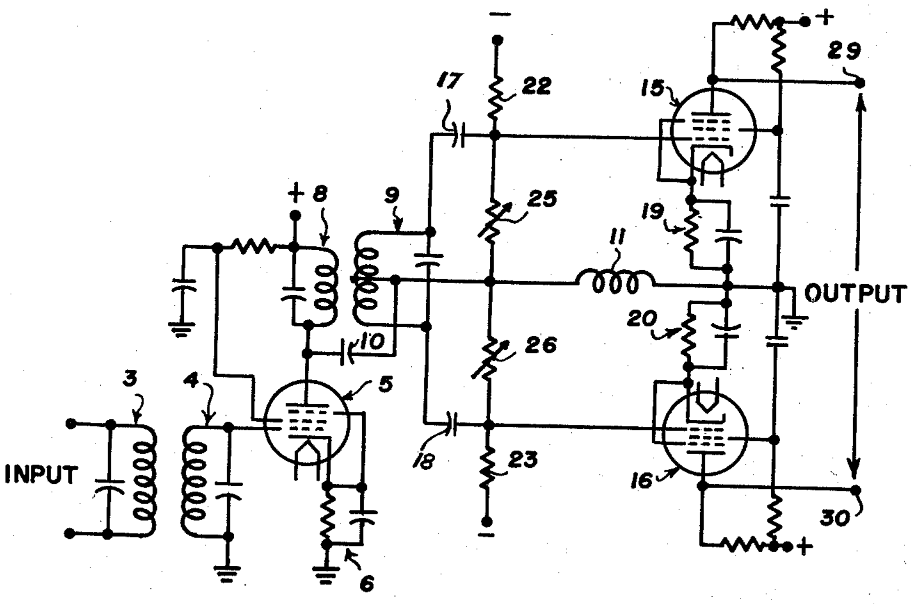
INVENTOR
CHARLES A. DEBEL
BY George Sipkin
B. L. Zangquill
ATTORNEY United States Patent Office 2,817,756

Patented Dec. 24, 1957

2,817,756

VARIABLE BANDWIDTH CONSTANT PEAK-AMPLITUDE DISCRIMINATOR

Charles A. Debel, Phoenix, Ariz., assignor, by mesne assignments, to the United States of America as represented by the Secretary of the Navy Application June 3, 1952, Serial No. 291,523

3 Claims. (Cl. 250—27)

The present invention relates to a frequency discriminator and more particularly to a variable bandwidth discriminator with a constant amplitude output.

Frequency discriminators usually include one or more tuned circuits which pass signals in a desired frequency range. It is usually desirable that such circuits may be adjusted to efficiently receive signals having a greater or lesser swing about a midfrequency. It is an important object of this invention to provide novel circuit means for varying the bandwidth of a signal passed through a frequency discriminator and concurrently retaining a constant amplitude output.

A common method of varying the bandwidth involves changing the "Q" of one or more of the tuned circuits in the discriminator. The Q of a tuned circuit may be thought of as a measure of the tuning efficiency. If the pure D. C. resistance is low, the efficiency of the circuit is high; if the D. C. resistance is high, the efficiency is low. This is apparent from the mathematical definition of Q, which is the ratio of the inductive reactance of the tuning coil at resonance to the pure D. C. resistance in the circuit. If the Q is high the resonance curve of the circuit is high at the midfrequency and falls away sharply on either side of it. If the Q is low, the resonance curve is flat at the midfrequency and falls away on either side less sharply.

It is apparent to those skilled in the art that by increasing the D. C. resistance in a tuned circuit the resonance curve may be flattened and the tuning made less sharp. In a discriminator circuit, this is equivalent to saying that the bandwidth is widened.

It must also be noted that a variation in D. C. resistance which changes the Q of a tuned circuit in a discriminator also affects the amplitude of the output wave. The circulating current through a parallel resonant tuned circuit varies inversely with the D. C. series resistance in the circuit. If the tuned circuit is coupled to an output circuit by means of inductive coupling, a variation in the D. C. series resistance in the tuned circuit will inversely affect the amplitude of the output current.

It is therefore apparent that widening of bandwidth passed usually will result in a reduction of the amplitude of the output wave, and narrowing of the bandwidth will increase the amplitude of the output wave. To vary the bandwidth without altering the output amplitude is the problem which has not been overcome satisfactorily by the prior art. The present invention provides novel and extremely simple circuit means to hold the amplitude constant as the bandwidth is changed in a frequency discriminator.

The circuit presented here is designed to receive a signal, pass it through a tuned circuit, amplify it, and pass it through another tuned circuit. The signal is then fed to a push-pull amplifier including two pentodes arranged to receive portions of the signal 180 degrees out of phase with respect to each other. In the control grid circuit of each pentode there is included a rheostat which varies the negative bias of the grids with respect to ground.

As the bias becomes less negative the amplification of the tubes is increased. The rheostats are also shunted across the tuned circuit from which the signal is fed to the pentodes. Consequently varying the rheostats also causes a change in the D. C. resistance in the tuned circuit. This, of course, varies the Q of the tuned circuit and varies the bandwidth passed. It may be seen that by varying the two rheostats the bandwidth is changed, and there is an accompanying change in amplification factor of the pentodes which just compensates for the amplitude change of the passed signal.

Accordingly it is an object of the invention to provide a discriminator circuit which passes a signal of variable bandwidth without normal signal decrease.

It is another object of the invention to provide a discriminator circuit which may be adjusted to pass a signal of variable bandwidth and which includes amplifier means to maintain the passed signal at constant amplitude.

It is a still further object to provide a frequency discriminator having a tuned circuit associated with the grid circuit of an amplifier unit so that a change in D. C. resistance in the tuned circuit also effects a change in the operating characteristics of the amplifier unit.

It is a still further object to provide a discriminator circuit wherein a tuned circuit and an amplifier unit are associated with each other through variable resistance means so that a change in the variable resistance brings about variation in the bandwidth of the signal passed and also effects the amplifier unit so that a constant amplitude signal is always passed.

Other objects and many of the attendant advantages of this invention will be readily appreciated as the same becomes better understood by reference to the following detailed description when considered in connection with the accompanying drawing wherein the single figure illustrated is a circuit diagram of a preferred embodiment of the invention.

Referring now to the drawing, wherein like reference characters designate like or corresponding parts throughout the several views, there is shown in Figure 1 two tuned circuits 3 and 4 which pass an input signal of desired frequency to pentode 5. Pentode 5, which is cathode biased at 6, acts to amplify the received signal. Tuned circuit 8, in the anode circuit of pentode 5, is used to provide an output signal to tuned secondary circuit 9. Circuits 8 and 9 are coupled together by means of condenser 10, which connects the signal from tuned circuit 8 to the center of the secondary coil in tuned circuit 9. This forms a conventional discriminator of the Foster-Seeley type. R. F. choke 11 is also tied to the center tapped secondary of circuit 9; it blocks return of R. F. current to the cathodes of pentode amplifier tubes 15 and 16, and does not offer any substantial resistance to direct current.

Output voltages from secondary circuit 9 are passed through blocking condensers 17 and 18 to the control grids of pentodes 15 and 16 respectively. Pentodes 15 and 16 are arranged to provide amplification of the passed signal. The two tubes include cathodes which are connected to ground, and whose control grids are biased by means of bypassed cathode bias resistors 19 and 20 respectively. The control grids are further biased by connection to a source of negative voltage through voltage divider resistors 22, 25 and 23, 26. The direct current flow path from the control grids to the grounded cathodes is completed through rheostats 25 and 26 since no direct current can pass the blocking condensers 17 and 18. Although condensers 17 and 18 could be replaced by a single condenser connected between R. F. choke 11 and the center tap on the coil of circuit 9, the two condenser arrangement is used since it acts to isolate the circuitry of tube 15 from that of tube 16. Terminals 29 and 30 are provided so that an output from the tubes may be taken.

The Foster Seeley discriminator formed between circuits 8 and 9 acts in the conventional manner to produce signals proportional to frequency variation of the input signal. These signals are made available at condensers 17 and 18, and are simplified by tubes 15 and 16. Variation of rheostats 25 and 26 control these signals so that constant amplitude is maintained as the bandwidth is varied. This is explained below.

In operation an input signal is applied to primary circuit 3 and coupled to secondary circuit 4. These two circuits are tuned so as to pass only a desired band of frequencies. The passed signal is fed to tube 5 and amplified. An output from tube 5 is taken by means of circuit 8 in the anode circuit of the tube. By means of circuit 9 and condenser 10 there are obtained signals which are fed through condensers 17 and 18 to pentode tubes 15 and 16 respectively for amplification.

When it is desired to vary the bandwidth of the signal to be received it is necessary to vary the resonance curve of tuned circuit 9. This is easily done by varying the D. C. resistance of the circuit. Rheostats 25 and 26 reflect back D. C. resistance into circuit 9; consequently variation of these rheostats change the Q and the resonance curve of the tuned circuit 9.

At the same time variation of rheostats 25 and 26 changes the control grid bias on the pentodes 15 and 16. These grids are biased by a combination of fixed cathode and variable grid bias means. It is seen that the fixed cathode bias is provided at 19 and 20 since there is a complete D. C. path through R. F. choke 11, rheostats 25 and 26, and tubes 15 and 16. The variable grid bias is provided because of the connections of the grids to the voltage dividers 22, 25 and 23, 26.

As rheostat 25 or 26 is varied, the bias to tube 15 or 16 respectively is varied. For tube 15 the total control grid bias is determined to be the sum of the cathode bias at 19 and the variable bias applied by the voltage divider action of rheostat 25 and resistor 22. The variable bias may be calculated as:

$$\text{Variable bias voltage} = \frac{R25}{R25+R22}(Es)$$

Where $R25$=resistance of potentiometer 25
$R22$=resistance of resistor 22
$Es$=voltage from ground to low potential side of resistor 22

A similar computation may be made for tube 16 with the result that:

$$\text{Variable bias voltage} = \frac{R26}{R26+R23}(Es)$$

Where $R26$=resistance of potentiometer 26
$R23$=resistance of resistor 23
$Es$=voltage from ground to low potential side of resistor 23

Thus it is seen that as the resistance of rheostats 25 and 26 is increased, the value of the variable bias voltage will be increased, and cause the total bias to be increased. This, of course, will cause the tubes to pass less current since a more negative voltage is applied to the grid of the tubes.

Similarly, if the resistance of rheostats 25 and 26 is decreased the grid bias will decrease and cause the tubes to pass more current.

It is apparent that the circuit is so arranged that bandwidth of signal passed is correlated with amplitude of signal passed. If the rheostats 25 and 26 are varied so that more resistance is added, there is reflected back a decreased series resistance in the tuned circuit 9. This is because the rheostats 25 and 26 are in parallel with the tuned circuit 9; the increased resistance paralleling circuit 9 cuts down the current taken out of the tuned circuit. This results in greater series current or less effective series resistance in the tuned circuit. Less series resistance means that the Q of the circuit is increased, and the bandwidth that the tuned circuit will pass is narrowed. As explained earlier, this would normally be accompanied by increased amplitude of output signal. However, in this circuit when the bandwidth to be passed is narrowed by increasing the resistance of rheostats 25 and 26 the negative grid bias on the tubes 15 and 16 is increased. By proper choice of circuit constants, the amplification of the tubes may be so correlated with bandwidth to be passed that the amplitude of the output signal remains about the same as the bandwidth is varied.

It is apparent to those skilled in the art that this discriminator circuit is ingenious in its simple control of bandwidth and amplitude of a passed signal. By means of variable resistances between a tuned circuit and an amplifier unit, variation in bandwidth is exactly correlated with variation in amplitude. The invention surpasses anything known in the prior art in that a single control accomplishes two required functions. It is unnecessary to provide one control to vary the bandwidth and another to adjust the amplitude. This invention provides simultaneous control of bandwidth and amplitude in a simple and novel fashion.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A circuit comprising in combination, a parallel resonant circuit for passing a desired band of frequencies to an output circuit, amplifier means having an input circuit, variable bias supply means including a source of direct current in series with a voltage divider having a variable resistance connected across the input circuit of the amplifier means, and direct current blocking condenser means coupling the output circuit of said resonant circuit across the variable resistance of said bias means and to said input circuit, whereby adjustment of the variable resistance changes the loading across said resonant circuit to alter its bandwidth and changes the bias on the amplifier means input circuit for effecting a variation in amplifier gain in the direction opposing the amplitude-changing tendency of the variations in bandwidth passed by said resonant circuit.

2. A frequency discriminator comprising a tuned circuit having two output terminals and a center tap serving as a reference terminal, a pair of adjustable resistive elements serially connected to provide a junction therebetween and a pair of outer terminals, said junction being connected to said reference terminal, a pair of blocking condensers coupling said outer terminals to said output terminals, whereby said resistive elements load the tuned circuit, a pair of amplifier tubes arranged in push-pull relationship with their input circuits bridging said resistive elements and coupled through said blocking condensers to the output terminals of the tuned circuit, a pair of fixed resistances, and a source of direct current negative bias connected through said fixed resistances to said outer terminals, whereby adjustment of the resistive elements varies both the loading of the tuned circuit and the bias across said input circuits.

3. A frequency discriminator having a tuned circuit, an amplifier unit having an input terminal, an output terminal, and a common input and output terminal, a control rheostat connected between the input terminal and said common terminal and in loading relation across the tuned circuit, and means coupling the tuned circuit to the input terminal and said common terminal of the amplifier unit, whereby adjustment of the control rheostat simultaneously varies the sharpness of tuning of the tuned circuit and the gain of the amplifier unit.

References Cited in the file of this patent

UNITED STATES PATENTS

| | | |
|---|---|---|
| 2,068,112 | Rust | Jan. 19, 1937 |
| 2,248,343 | Elliott | July 8, 1941 |

| | | |
|---|---|---|
| 2,253,942 | Rath | Aug. 26, 1941 |
| 2,278,801 | Rust | Apr. 7, 1942 |
| 2,304,978 | White et al. | Dec. 15, 1942 |
| 2,356,201 | Beers | Aug. 22, 1944 |
| 2,357,932 | Crosby | Sept. 12, 1944 |
| 2,464,125 | Fisher et al. | Mar. 8, 1949 |
| 2,576,329 | Bell | Nov. 27, 1951 |
| 2,605,358 | Neher | July 29, 1952 |

U. S. DEPARTMENT OF COMMERCE

PATENT OFFICE

CERTIFICATE OF CORRECTION

Patent No. 2,817,756 December 24, 1957

Charles A. Debel

It is hereby certified that error appears in the printed specification of the above numbered patent requiring correction and that the said Letters Patent should read as corrected below.

Column 3, line 8, for "simplified" read --amplified--.

Signed and sealed this 8th day of April 1958.

(SEAL)
Attest:
KARL H. AXLINE

Attesting Officer

ROBERT C. WATSON
Commissioner of Patents